March 21, 1950 A. L. HARTLEY ET AL 2,500,989

METALLURGICAL APPARATUS

Filed July 10, 1946 11 Sheets-Sheet 1

INVENTORS.
ALBERT L. HARTLEY,
ADOLPH H. DAVIS AND
WILLIAM D. WHALEN

BY Toulmin & Toulmin

ATTORNEYS.

March 21, 1950 A. L. HARTLEY ET AL 2,500,989

METALLURGICAL APPARATUS

Filed July 10, 1946 11 Sheets-Sheet 2

INVENTORS.
ALBERT L. HARTLEY,
ADOLPH H. DAVIS AND
WILLIAM D. WHALEN

BY Toulmin & Toulmin

ATTORNEYS.

March 21, 1950 A. L. HARTLEY ET AL 2,500,989

METALLURGICAL APPARATUS

Filed July 10, 1946 11 Sheets-Sheet 3

INVENTORS.
ALBERT L. HARTLEY,
ADOLPH H. DAVIS AND
WILLIAM D. WHALEN

BY Toulmin & Toulmin

ATTORNEYS.

INVENTORS.
ALBERT L. HARTLEY,
ADOLPH H. DAVIS AND
WILLIAM D. WHALEN
BY
Toulmin & Toulmin
ATTORNEYS.

March 21, 1950 A. L. HARTLEY ET AL 2,500,989

METALLURGICAL APPARATUS

Filed July 10, 1946 11 Sheets-Sheet 5

INVENTORS.
ALBERT L. HARTLEY,
ADOLPH H. DAVIS AND
WILLIAM D. WHALEN

BY Toulmin & Toulmin

ATTORNEYS.

March 21, 1950 A. L. HARTLEY ET AL 2,500,989
METALLURGICAL APPARATUS
Filed July 10, 1946 11 Sheets-Sheet 6

INVENTORS.
ALBERT L. HARTLEY,
ADOLPH H. DAVIS AND
WILLIAM D. WHALEN
BY
Toulmin & Toulmin
ATTORNEYS.

INVENTORS.
ALBERT L. HARTLEY,
ADOLPH H. DAVIS AND
WILLIAM D. WHALEN

BY Toulmin & Toulmin

ATTORNEYS.

INVENTORS.
ALBERT L. HARTLEY,
ADOLPH H. DAVIS AND
WILLIAM D. WHALEN
BY
Toulmin & Toulmin
ATTORNEYS.

METALLURGICAL APPARATUS

Filed July 10, 1946

SPOT HARDENING

PROGRESSIVE

PROGRESSIVE INDEXING

PROGRESSIVE SPINNING

SPINNING ①

SPINNING ②

INVENTORS.
ALBERT L. HARTLEY,
ADOLPH H. DAVIS AND
WILLIAM D. WHALEN

BY Toulmin & Toulmin
ATTORNEYS.

METALLURGICAL APPARATUS

INVENTORS.
ALBERT L. HARTLEY,
ADOLPH H. DAVIS
AND WILLIAM D. WHALEN
BY
Toulmin & Toulmin
ATTORNEYS.

March 21, 1950 A. L. HARTLEY ET AL 2,500,989

METALLURGICAL APPARATUS

Filed July 10, 1946 11 Sheets-Sheet 11

INVENTORS.
ALBERT L. HARTLEY,
ADOLPH H. DAVIS AND
WILLIAM D. WHALEN

BY Willard S. Groene
ATTORNEY.

Patented Mar. 21, 1950

2,500,989

UNITED STATES PATENT OFFICE 2,500,989

METALLURGICAL APPARATUS

Albert L. Hartley, Cincinnati, and Adolph H. Davis and William D. Whalen, Norwood, Ohio, assignors to The R. K. Le Blond Machine Tool Co., Cincinnati, Ohio, a corporation of Delaware Application July 10, 1946, Serial No. 682,464

1 Claim. (Cl. 266—4)

This invention pertains to metallurgical apparatus for surface hardening metallic objects. More particularly, this invention pertains to improved procedure and apparatus for surface hardening metallic work pieces by flame hardening.

The surface hardening process is well adapted to a large variety and type of work with the result that heretofore difficulty has been experienced in providing an apparatus capable of accommodating itself to the efficient surface hardening of a large variety of work pieces with a minimum of loss of set up time and with equal efficiency and accuracy of result for all of the different types of work pieces treated. Applicants have therefore developed a machine and procedure which is quickly adaptable and adjustable to take care of all kinds, sizes, and types of work pieces and which may be readily accurately controlled by the operator from a centralized control station to produce the uniformity of result for any type of work piece undertaken.

One of the objects of this invention is to provide an efficient and accurately controllable method of surface hardening a work piece in an automatic manner.

Another object of this invention is to provide surface hardening apparatus which is universally adaptable with equal efficiency and accuracy of control to any variety and type of work piece.

Still another object of this invention is to provide a surface hardening machine capable of rapid adjustment and nicety of control for performing a series of different hardening procedures.

And a still further object of this invention is to provide a universal surface hardening machine having a centralized control panel adapted to be regulated to provide a series of work cycles adapted to perform surface hardening operations on a wide variety of work pieces.

A further object is to provide a flame hardening machine adapted to effect relative movement between the work piece and the heating and quenching burners in a series of predetermined operating cycles adapted to accommodate a large variety and type of work.

It is also an object to provide, in a flame hardening machine, a novel arrangement of the operator's control station and its relationship to the burners and work fixture holding devices of the machine, so as to provide an efficiently controllable and operable machine.

And still another object of this invention is to provide a universal flame hardening machine having a series of adjustable control mechanisms for automatically controlling the relative movement of work and burner and the igniting and extinguishing of the burner flames in a series of predetermined operating cycles adapted to a wide variety of work pieces.

It is also an object of this invention to provide a universal flame hardening machine for effecting relative movement of work and tool in a vertical direction and with a selectable variety of operating cycles readily obtainable from a centralized control panel of the machine.

And still another object of this invention is to provide, in a flame hardening machine, apparatus readily adjustable for selecting a series of predetermined operating cycles controlling the relative movement of work and burner, the igniting and extinguishing of the burner flames, the control of the quenching liquid, and the manipulation of the work to and from treating position.

Further features and advantages of this invention will appear from a detailed description of the drawings in which:

Figure 1 is a front elevational of view of a universal surface hardening machine incorporating the features of this invention.

Figure 1*a* is a fragmentary view of a work holder arrangement of the machine in Figure 1 used in spot hardening work pieces.

Figure 2 is a plan view of the machine shown in Figure 1.

Figure 2*a* is a fragmentary enlarged section on the line 2*a*—2*a* of Figures 1 and 5.

Figure 7A:
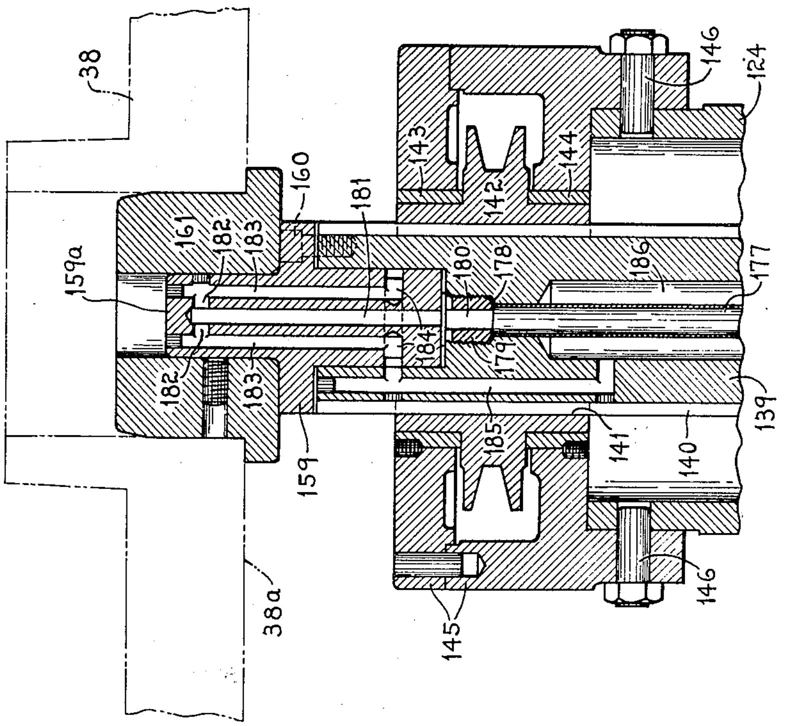
Figure 7 is a fragmentary enlarged view of the control panel of the machine indicated by the line 7—7 in Figure 2.
Figure 8:
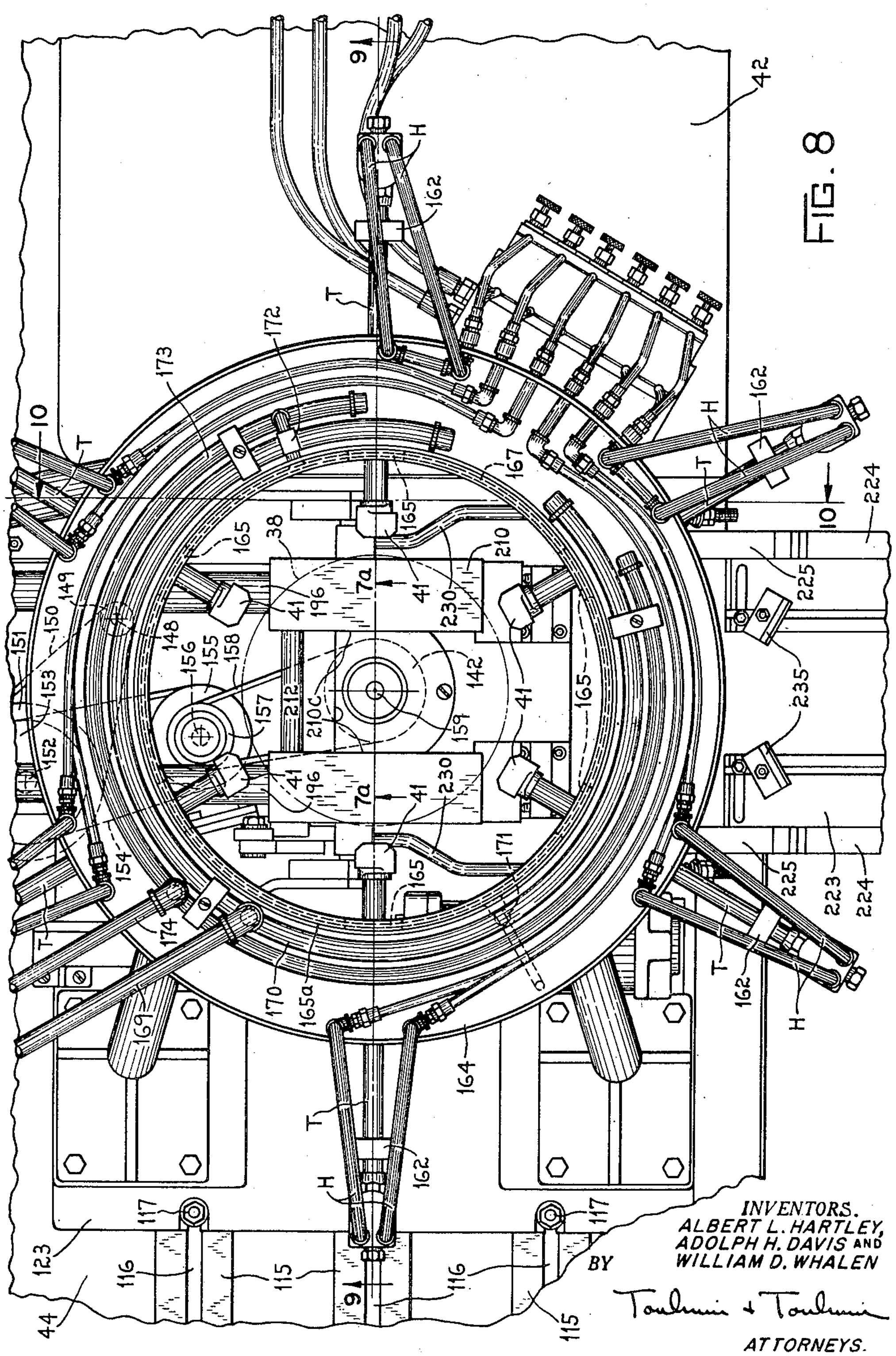

Figure 7*a* is an enlarged fragmentary section on the line 7*a*—7*a* of Figure 8.

Figure 8 is a plan view of the machine set up for performing spinning surface hardening operations.

Figure 9:
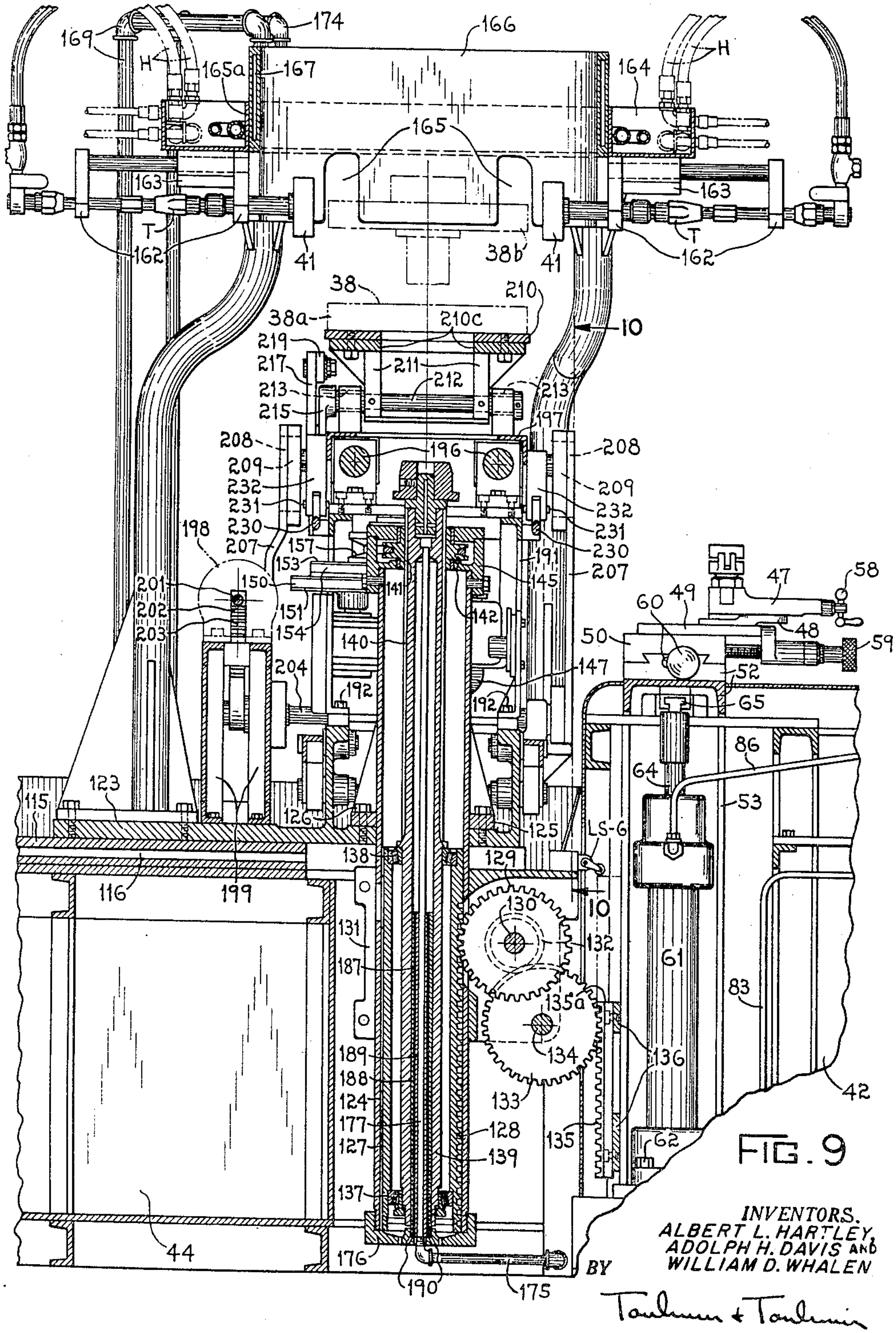
Figures 10, 11:
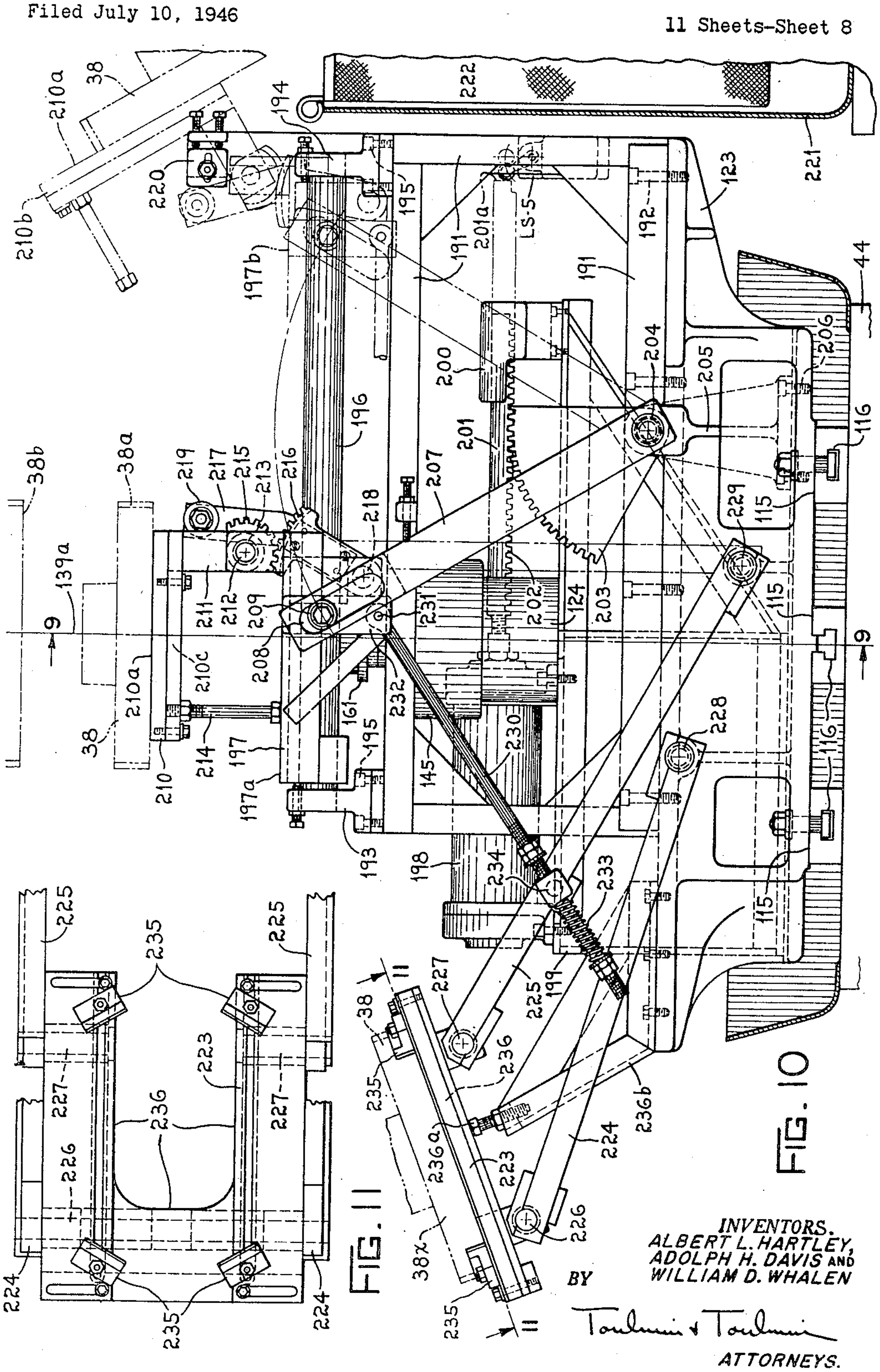

Figure 9 is an enlarged fragmentary section on the line 9—9 of Figures 8 and 10.

Figure 10 is a transverse section on the line 10—10 of Figures 8 and 9, particularly showing the work handling mechanism.

Figure 11 is a fragmentary enlarged view of the work receiving platform, indicated by the line 11—11 of Figure 10.

Figure 12:
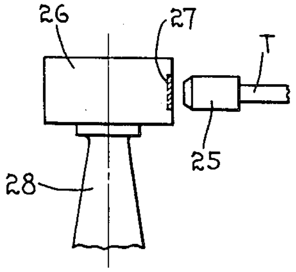

Figure 12 is a diagram showing spot hardening procedure.

Figure 13:
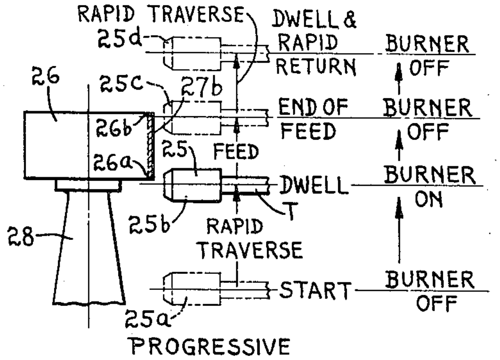

Figure 13 is a diagrammatic view illustrating progressive hardening procedure with fixed work piece.

Figure 14:
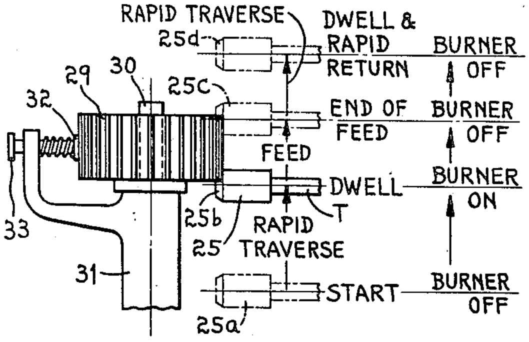

Figure 14 is a diagrammatic view showing progressive hardening procedure with indexing of the work piece.

Figure 15:
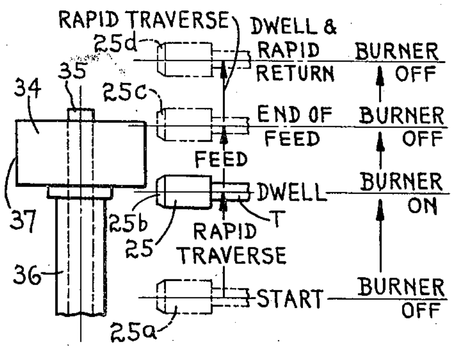

Figure 15 is a diagrammatic view showing progressive hardening procedure with spinning or rotating work piece.

Figure 16:
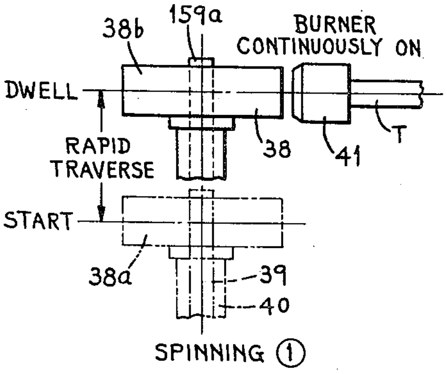

Figure 16 is a diagrammatic view showing hardening by spinning procedure with fixed burner and movable work piece.

Figure 17:
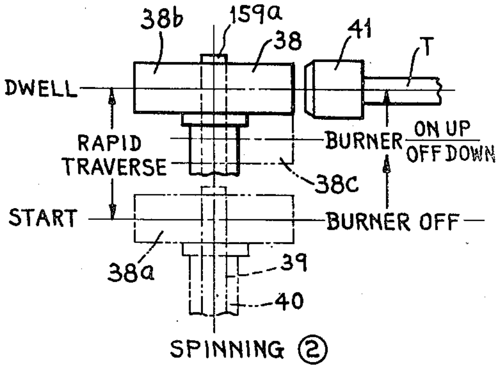

Figure 17 illustrates a modification of the spinning hardening procedure of Figure 16.

Figure 18:
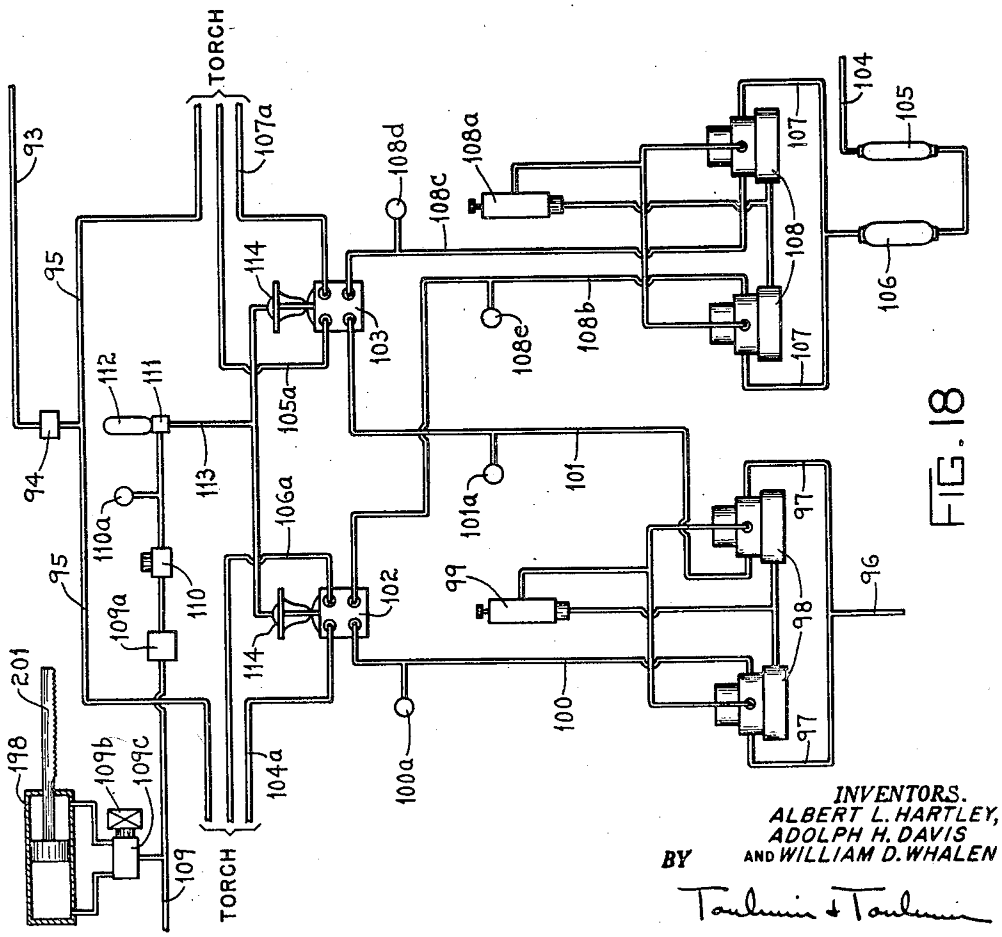

Figure 18 is a circuit diagram of the oxygen-acetylene gas, city gas supply, and compressed air control circuits.

Figure 19:
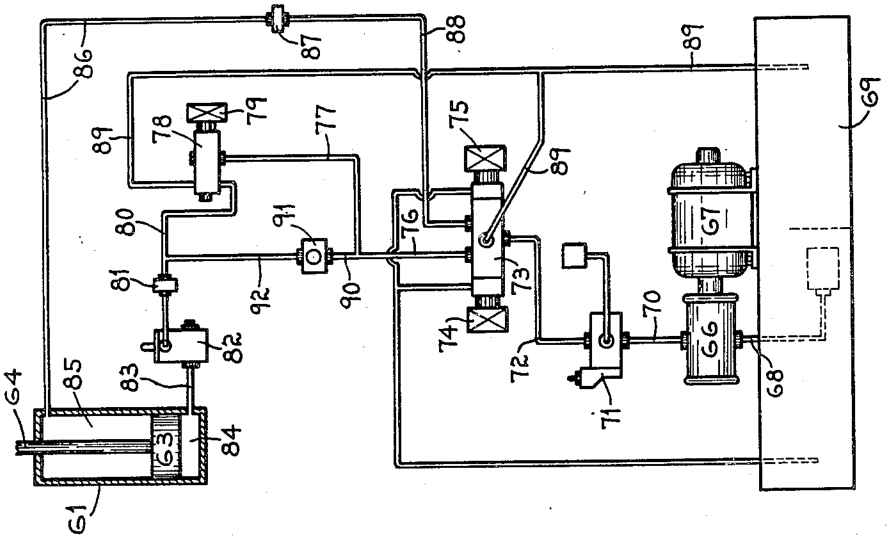

Figure 19 is a hydraulic circuit diagram for the actuating mechanism of the machine effecting relative movement of work and burner.

Figure 20:
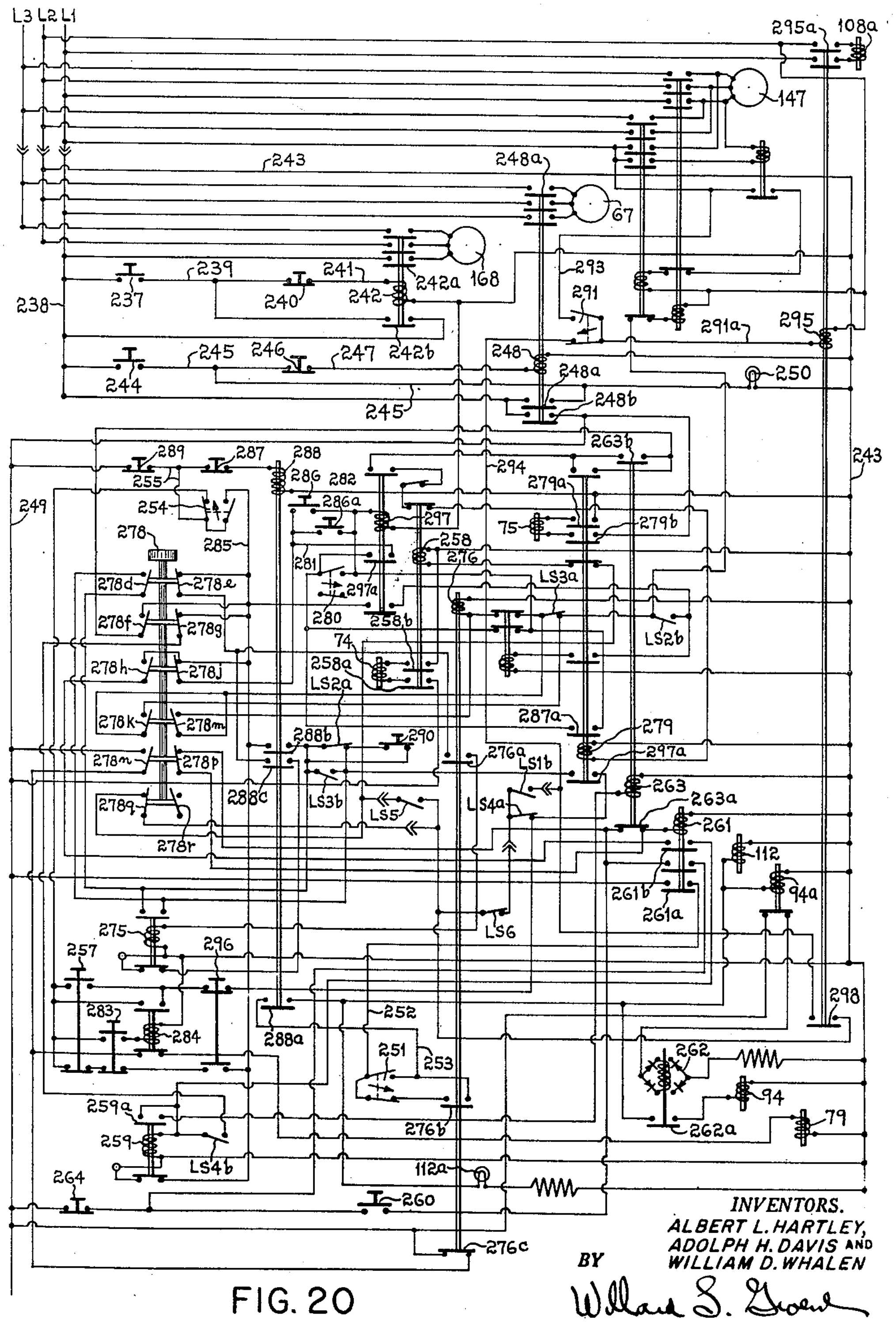

Figure 20 is an elementary wiring diagram of the electrical operating and control circuits of the machine.

*Operating procedures*

Applicants' invention comprises a universal surface hardening machine adapted to perform a series of different surface hardening procedures such as illustrated diagrammatically in Figures 12 through 17, inclusive.

Spot hardening procedure, Figure 12, comprises setting the heating element or burner 25 in some definite fixed position with respect to the work piece 26. The heat or flames from the burner 25 are applied to heat a particular spot 27 on the work piece 26 for a given period of time until this spot has reached the quenching temperature. After it has reached the quenching temperature, either the flames of the burner 25 are extinguished and the part is quenched in the position shown on the fixed pedestal or work holder 28, or the burners are left in operation but the work piece removed from the work support 28 and quenched.

Progressive surface hardening procedure with the work 26 held in a fixed position on the work support 28 is illustrated in Figure 13. The burner 25 at the start of the progressive hardening cycle is at a retracted downward position **25*a* and first traverses upwardly at a rapid rate to position 25*b* where the burner is ignited. Also, at the same point, the burner stops in dwell to give the flames time to sufficiently preheat the initial edge 26*a* of the work to bring it to proper quenching temperature. After a predetermined interval of time has elapsed, which is precisely controlled to effect the exact preheating of the initial edge, the burner then continues automatically at a predetermined feed rate to progressively harden the surface 27*b*. This feeding motion continues until the burner arrives at position 25*c*, at which point the flames are extinguished and the burner again held in dwell sufficiently long to allow the quenching medium to properly quench the final edge 26*b* of the work. The flames are also extinguished at a point slightly back from the concluding edge of the work surface 27*b* so that these edges will not be excessively heated beyond their normal quenching temperature. After the conclusion of the proper quenching of the final edge, the burner 25 then automatically moves at rapid traverse upwardly to the position 25*d*, at which point a rapid return movement is automatically effected for the burner, bringing it back rapidly to the initial starting position 25*a*** to complete an automatic progressive hardening cycle.

Progressive surface hardening with indexing is illustrated in Figure 14. In this procedure, the burner moves in the same fashion as in Figure 13 over the surfaces of the teeth of a gear 29 which is rotatably mounted on a suitable mandrel 30 of the work holder 31. An indexing plunger 32 is provided which may be actuated by a control knob or any other suitable means 33 for successively presenting each tooth of the gear 29 into proper operative position with the flame hardening burner 25. Thus, as each upward and return movement of the burner 25 is completed, the indexing plunger 32 is pulled out and the gear 29 rotated to present a new unhardened tooth to position for flame hardening by the burner 25. This process is continued until the entire set of teeth of the gear have been finished.

Progressive spinning surface hardening procedure is still another way of surface hardening a work piece. In this arrangement, as particularly illustrated diagrammatically in Figure 15, the burner 25 may be operated in a work cycle as shown in Figure 13. In this instance, the work piece 34 is fixed on a rotating mandrel 35, carried in a work holder 36 so that the work piece 34 may be continually rotated at a desired rate while the flame hardening burner 25 proceeds upwardly in rapid traverse, feed, rapid traverse, and rapid return movements, as indicated in Figures 13 and 14. In this way, the entire peripheral surface 37 of the work piece, which may be a cylindrical gear blank or the like, may be accurately and automatically surface hardened.

Spin surface hardening may be performed in two different ways: In the first procedure, as illustrated in Figure 16, the burners 41 will be continuously burning and the work piece 38 moved upwardly at rapid traverse movement from initial starting position **38*a* to working position 38*b*, the work piece being mounted on a rotating mandrel 39 appropriately driven at a suitable speed. The work is continuously rotated in working position 38*b* for a predetermined period of time, after which it will be traversed down out of the flame and removed from the work holder mandrel 39, appropriately journaled in the work holder housing 40. Immediately as the work is removed from the mandrel 39**, it is quenched and another piece put on the fixture and the cycle repeated. The manipulation of the work piece in this arrangement may be done by automatic work handling mechanism which places work on and removes it from the work holding mandrel and automatically presents it to the quenching medium.

In the second procedure, illustrated in Figure 17, the work piece 38 is traversed upwardly from initial starting position **38*a* up to the vicinity of the burner at 38*c*, at which point the burner is ignited and the work piece continues on up into working position 38*b*. After a predetermined time has elapsed with the work piece 38 rotating in the position 38*b* and the burner operating, the work piece is then traversed back to starting position 38*a* at rapid movement and the flames extinguished on the downward traverse of the work piece at the same point 38*c*** that they were ignited on the upward traverse of the work piece.

General machine arrangement

Applicants' machine is of universal character adapted to perform any of the aforementioned methods of procedure by apparatus capable of simple, quick, and accurate adjustment by the operator. While, for illustrative purposes, the machine is shown adapted to the use of the oxy-acetylene burner type of heating element, it is to be understood that the machine is as well adapted to using any other type of heating element such as electronic induction heating apparatus or the like.

The general arrangement of the machine comprises an L-shaped control cabinet section, Figures 1, 2, 3, and 4, having a lower horizontal portion indicated generally at 42 and a vertical upstanding portion 43. Fixed or otherwise associated with lower portion 42 is the work supporting and coolant base 44. The heating elements, in this case the flame hardening torches or blow pipes T, are mounted in the heating element operating area 45 formed by the members 42 and 43 of the L-shaped control cabinet. On the angularly disposed front face 46 of the upright portion 43 of the control cabinet section is provided the control panel for adjusting the machine for performing any of the aforementioned modes of operations. Thus there is provided an L-shaped control cabinet section formed by the members 42 and 43 having a burner operating area or heating element operating area at 45 and an angularly disposed control panel area 46 on the upright section 43 of the cabinet section wherein is provided the highly efficient operating mechanism, convenient of adjustment and nicety of control by the operator.

Torch carriage

The blow pipes or torches T are each carried on compound rests 47 which are mounted on swivel bases 48 on the cross slides 49. The cross slides 49 in turn are mounted on the slide members 50 which in turn are mounted on suitable dovetail guideways 51 on the top platen 52 of the torch carriage. The platen 52 is formed integrally to a pair of side members 53 which in turn are integrally connected to the sliding journals 54 vertically slidable on the guide rods 55 securely fixed at 56 to the frame of control cabinet member 42 of the machine. The upper ends of the guide rods 55 are tied together by a suitable tie bar arrangement indicated at 57.

The torches T may be adjusted in any universal horizontal position by manipulating the control handles 58 of the compound rests, swivelling the compound rests on their bases 48, adjusting the cross slide screws 59, and adjusting the screws 60 for manipulating the slide members 50.

Figure 6:
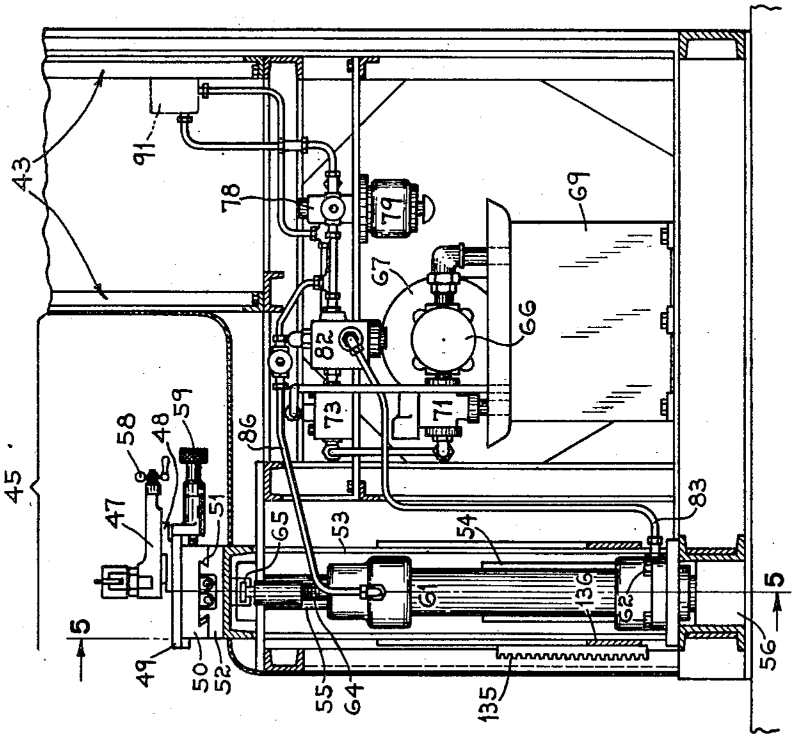
Figure 6 is an enlarged longitudinal vertical section through the machine on the line 6—6 of Figures 2, 3, 4, and 5.

The vertical movement of the torch carriage is effected by hydraulic fluid pressure operating and control mechanism for performing desired work cycles to effect the surface hardening operations on the work. A fluid pressure cylinder 61 is rigidly mounted to the frame 42 by suitable screws 62, the cylinder having a suitable piston 63, Figure 19, to which is connected the piston rod 64 and which projects upwardly from the cylinder and is rigidly connected to the platen 52 of the torch carriage by a suitable connection at 65, Figures 5 and 6. The fluid pressure for operating the cylinder 61 to reciprocate the torch carriage in vertical movements is derived from the fluid pressure pump 66, Figure 19, which is driven by a suitable electric motor 67 and receives a supply of fluid through the suction line 68 from the fluid reservoir 69. Pressure from the pump 66 passes out through the pressure line 70, through the high pressure relief valve 71, through the line 72, to the solenoid operated control valve 73.

In order to effect upward rapid traverse movement of the piston 63, piston rod 64, and the torch carriage, solenoid 74 of the control valve 73 is energized while its solenoid 75 is de-energized. Under these conditions, fluid pressure passes through the valve 73 into the line 76 and through the line 77 to the solenoid operated rapid traverse valve 78 whose solenoid 79 at this time is energized so as to inter-connect line 77 with the line 80. Fluid pressure from the line 80 passes through the needle valve 81 which is open at this time, and the pressure regulating valve 82 through the line 83 to the lower chamber 84 in the cylinder 61. As the piston 63 and connected torch carriage rise at rapid traverse movement, fluid in the chamber 85 of the cylinder 61 is discharged out through the line 86, through the needle valve 87, which is open at this time, into the line 88 and through the control valve 73 to the drain line 89.

In order to change the rapid upward movement to feed movement for the torch carriage, the solenoid 79 of the valve 78 is de-energized, closing off communication between lines 77 and 80. Fluid pressure from the line 76 under these conditions then must pass through the line 90 and the adjustable feed rate throttle control valve 91 on the control panel 46, Figure 7, which allows a limited amount of fluid pressure to enter the line 92 connected to the line 80, which fluid pressure passes through the valve 81, valve 82, line 83, into the chamber 84 of the cylinder 61. In order to arrest movement of the piston 63 in the cylinder 61, both solenoids 74 and 75 of the valve 73 are de-energized, blocking off the lines 72, 76, and 88 at the valve to lock piston 63 in any desired position in the cylinder 61. The needle valves 81 and 87 may be both closed off to trap fluid in cylinder 61 when the torch carriage is to be held in a particular position for a protracted period of time.

In order to effect rapid traverse downward movement, solenoid 74 of the valve 73 is de-energized while solenoid 75 is energized. This connects fluid pressure from the line 72 to the line 88 which passes through the open needle valve 87 into chamber 85, above the piston 63 to effect the downward traverse movement. At the same time, discharge fluid from the chamber 84 below the piston 63 passes out through the line 83, pressure regulating valve 82, valve 81, line 80, through the valve 78, whose solenoid 79 at the return rapid traverse movement is energized, through the line 77 and into the line 76 connected to the valve 73. Fluid pressure passes through the valve 73 at this time from the line 76 into the drain line 89. The stopping of the movement in downward motion is again effected by having both solenoids 74 and 75 of the valve 73 de-energized. Stopping may be effected at any time whether or not the solenoid 79 of the valve 78 is energized. Thus, by appropriately energizing the solenoids 74, 75, and 79 in the proper sequence, any desired direction and feed or rapid traverse movement may readily be effected in the burner carriage actuated by the cylinder 61.

*Gas supply circuits*

Referring particularly to Figure 18, the pilot lights for igniting the burners of the torches are preferably supplied from the city gas main comprising the line 93, having a solenoid operated gas valve 94 for regulating the flow of gas through the line 95 to the pilot lights for the burners.

The oxygen supply, which is preferably obtained from suitably charged gas cylinders connected to the line 96 and the branch lines 97, to the pressure regulating valves 98, each supplying a torch T. A suitable regulating valve 99 serves to regulate the output pressure of oxygen in the respective control valves 102 and 103.

The acetylene supply, or any equivalent combustible fuel, is connected to the line 104, through suitable back pressure valve 105 and flash-back arrestor 106 to the lines 107, connected to the acetylene pressure regulators 108, each of which is adjusted to maintain proper pressure supply to the torches by pilot valve 108*a*. Lines 108*b* and 108*c* connect the valve 108 for supply of acetylene to the control valves 102 and 103, each of which is adjusted to maintain proper pressure supply to the torches by pilot valve 108*a*. The oxygen supply lines 104*a* and 105*a*, respectively, are connected to the torches T1 and T2 from the valves 102 and 103 while the acetylene lines 106*a* and 107*a* from these valves are similarly connected to the torches T1 and T2.

Each of the oxygen-acetylene control valves 102 and 103 are operated by compressed air from a supply line 109 connected through a filter 109*a* and a pressure regulator 110 to the solenoid operated valve 111 having operating solenoid 112. Energizing of the solenoid 112 allows air pressure to enter the line 113 where it passes to the diaphragms 114 in the control valves 102 and 103 to operate them to connect the respective oxygen lines and acetylene lines to allow flow of the gases to the torches T1 and T2. De-energizing the solenoid 112 of valve 111 cuts off air pressure to allow valves 102 and 103 to close and thereby cut off the flow of oxygen and acetylene to the torches. The pilot lights, supplied by the lines 95, continue to burn at all times, with a low flame whenever the valves 102 and 103 are closed, but are caused to momentarily flare up with a much larger flame whenever the valves 102 and 103 are open, so the torches immediately light up when supplied with oxygen-acetylene. Pressure gauges 100*a* and 101*a* are provided in lines 100 and 101 to indicate the oxygen pressure being supplied to the torches while gauges 108*d* and 108*e* indicate the same for the acetylene. Gauge 110*a* indicates the condition of the compound air supply.

*Work holding apparatus*

The coolant and work supporting base 44 is provided with a series of mounting ways 115 in which are formed appropriate T-slots 116 for mounting various types of work fixtures or holding devices in the machine.

Figures 1, 1A:
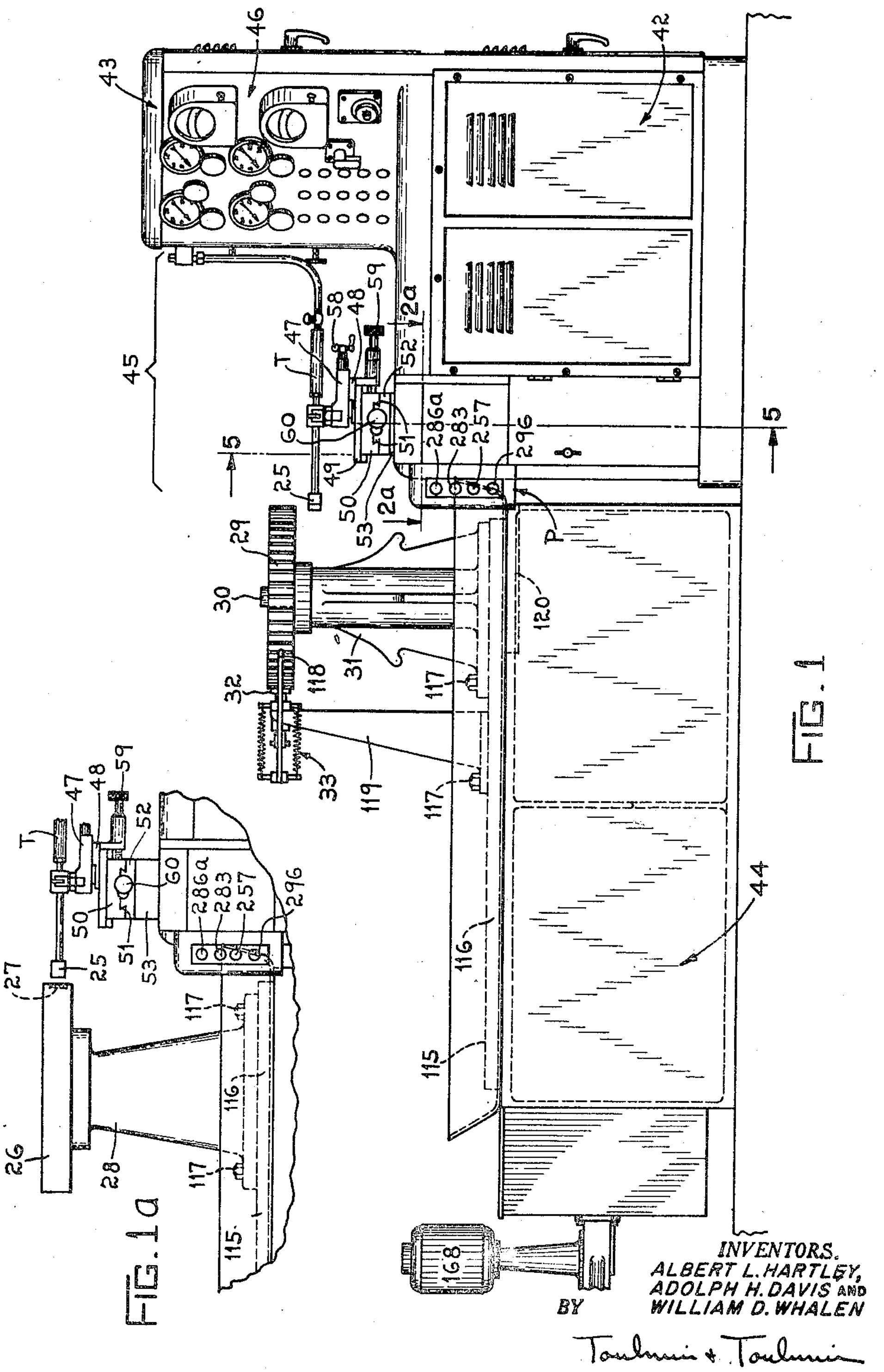

For spot hardening operations the arrangement shown in Figure 1*a* is preferably utilized comprising a work support or pedestal 28 secured by suitable T-slot bolts 117 in the T-slots 116 to firmly hold the pedestal 28 to the mounting ways 115. The work piece 26 is suitably clamped or otherwise fixed to the pedestal 28 so that the spot 27 to be hardened is positioned relative to the burner 25 of the torch T.

The set up for progressive hardening of the teeth of a gear is shown in Figures 1 and 14.

Here the work piece is mounted on a pedestal 31 rigidly secured to the rails 115 by suitable screws 117, the gear 29 in this case being rotatably mounted on a suitable mandrel 30 for horizontal rotation to successively present each gear tooth into position with the flame hardening burner 25. The burner in this case is appropriately shaped to properly apply the flames to the gear teeth. A suitable indexing fixture, indicated generally at 33 and having an index plunger 32 adapted to engage in the gear teeth and to be operated by a control handle 118, serves to accurately position each gear tooth in correct alignment with the burner 25 for each pass of the progressive flame hardening operation on the gear teeth. The indexing mechanism 33 is mounted on a suitable pedestal 119 fixed to the ways 115 by suitable T-slot bolts 117. In doing progressive flame hardening operations where the work piece is held rigidly as in Figure 13, the fixture of Figure 1*a* might well be used in which case the work piece 26 is held stationary while the burner is relatively vertically traversed and fed past the surface to be hardened on the work piece 26.

Figures 2, 2A:
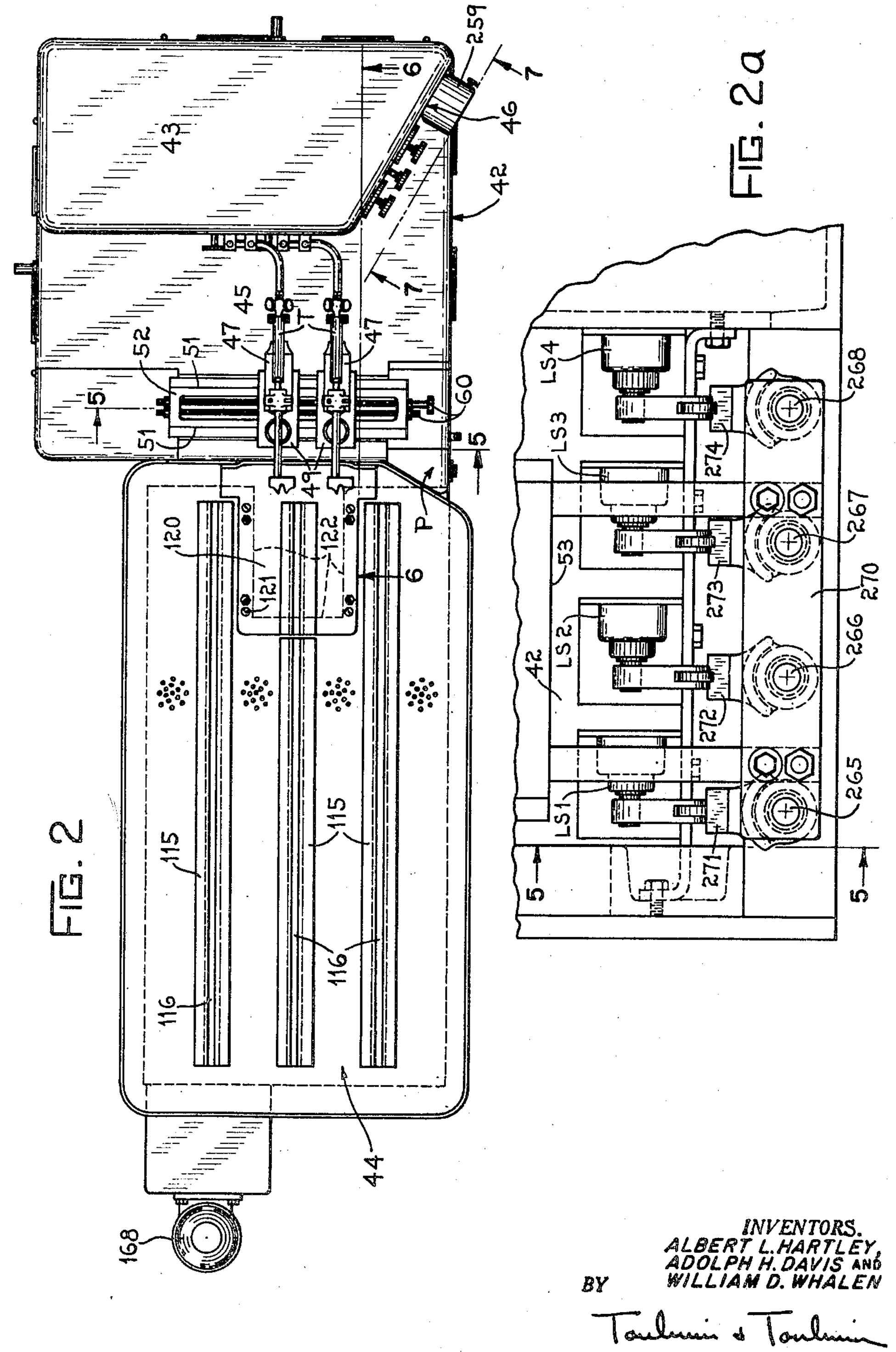
Figure 4:
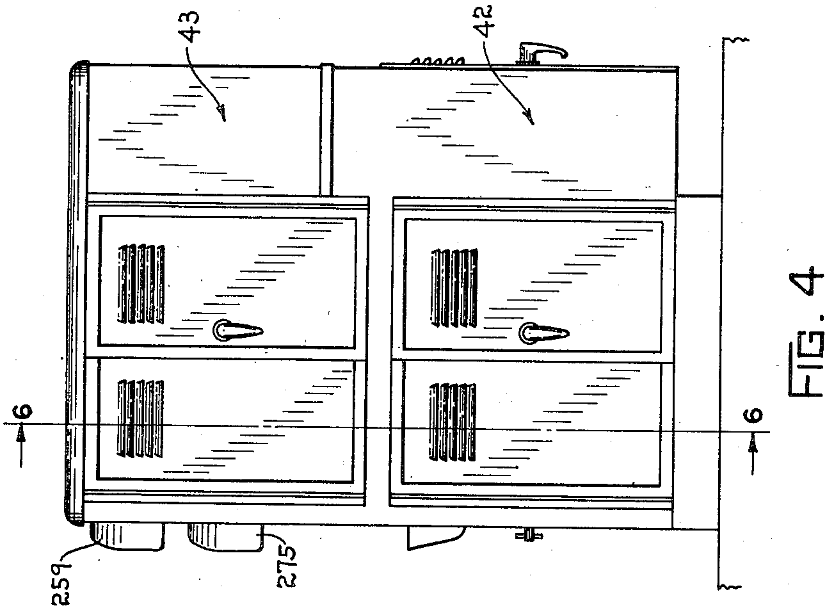
Figure 4 is a right-hand end elevation of the machine shown in Figures 1 and 2.
Figure 3:
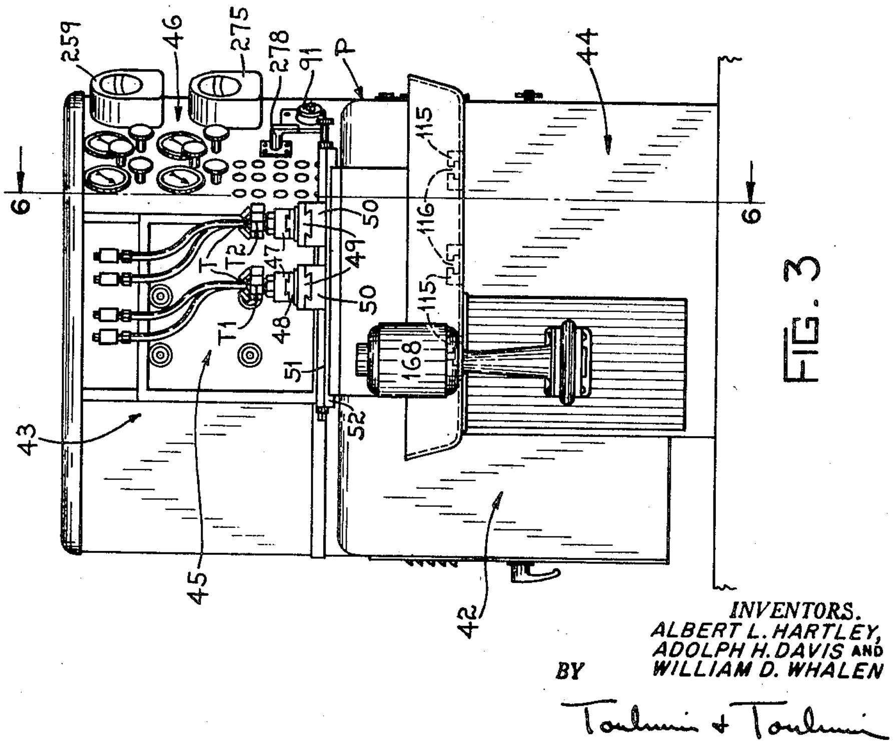
Figure 3 is a left-hand end view of the machine of Figures 1 and 2.

The apparatus utilized when doing spinning flame hardening operations, such as discussed in connection with Figures 16 and 17, is best shown in Figures 2, 3, and 9. Referring particularly to Figure 2, the top of the coolant base 44 is provided with a removable plate 120 which may be removed by taking out the screws 121 so as to provide an opening or slot 122 in the top of the base. The spinning work holder attachment frame 123 is then mounted on the guide ways 115 on the base 44 by suitable T-slot bolts 117, best shown in Figure 8. A vertical cylindrical sleeve member 124 is provided with a flange 125 which is secured to the frame 123 by screws 126 and extends downward through the slot 122 formed in the base 44. Reciprocatably mounted for vertical sliding movement and restricted against rotation in the sleeve 124 is a quill 127, Figure 9, which has a rack 128 formed thereon which is operatively engaged by a gear 129 mounted on a suitable shaft 130 journaled in a bracket 131 rigidly clamped around the sleeve 124. Also fixed on the shaft 130 is a gear 132 which is in driving engagement with a larger gear 133 journaled on a shaft 134 carried in the bracket 131. This last mentioned gear 133 is arranged to mesh with a rack 135 which is connected rigidly to the torch carriage as by means of a plate 136, best seen in Figure 5, which is secured to the members 53 of the torch carriage.

Journaled against axial movement in the quill 127 on suitable anti-friction bearings 137 and 138 is the work rotation spindle 139, the upper end portion of which is provided with a spline 140 which slidingly drivingly engages in a mating bore 141 formed in the driving pulley 142, Figure 7*a*. The driving pulley 142 is journaled in suitable bearings 143 and 144 in a bearing housing 145 secured to the top of the sleeve 124 by suitable means 146. Thus, the upper end of the work rotating spindle 139 is supported and accurately guided through the pulley 142 and bearings 143 and 144 at its upper end while at the same time it may be rotated by the pulley 142 while allowing free vertical movement of the quill and spindle in the sleeve 124.

The vertical reciprocation of the quill 127 is effected by appropriately applying fluid pressure in the torch carriage actuating cylinder 61 as described in connection with the hydraulic circuit of Figure 19. The gear ratio in this particular arrangement through the gears 133, 132, and 129 interconnecting the rack 135 on the torch carriage with the rack 128 on the quill is selected to effect a greater travel, approximately 2 to 1, for the quill 127 relative to the movement of the torch carriage.

The quill and work rotating spindle may be actuated at any desired feed or rapid traverse vertical movements by the same hydraulic control apparatus utilized for actuating the torch carriage. It is to be further noted that this spinning attachment may readily be mounted on the machine and interconnected with the operation of the hydraulic feed and rapid traverse cylinder 61 as best seen in Figure 9. Thus this apparatus may be attached or removed from the machine at any time without altering or effecting the proper and adequate control of the machine from the control panel 46 for any mode of operation including spinning operations. This arrangement allows the complete control mechanism to be utilized for both actuating the carriage by itself, for progressive, spot hardening, and similar operations while also allowing the same control apparatus to be used with equal facility for performing all types of spinning hardening operations.

The work spindle 139 may be rotated at desired speeds by means of an electric driving motor 147, Figure 9, having a shaft 148, Figure 8, upon which is mounted a suitable driving pulley 149 over which operates the belt 150 to drive a pulley 151 which pulley is suitably journaled on a shaft 152 mounted on the frame 123 and which pulley is integrally connected with a pulley 153 over which operates the belt 154 passing around the pulley 155, the latter of which pulleys is journaled on a suitable shaft 156 carried in the frame 123 and to which is also integrally fixed the pulley 157. The pulley 157 may preferably be of a variable speed type of pulley adjustable to increase or decrease the rate of speed drive through the belt 158 to the driving pulley 142 connected to drive the work spindle 139. Electric driving motor 147 may also be of the variable speed type to get additional speed changes to effect the proper rate of rotation in the work spindle 139.

On top of the work spindle 139 is fixed a mandrel 159, Figure 7*a*, by screws 160 having a projecting end 159*a* upon which may be put various types of work supporting bushings 161 for carrying a work piece 38. The work spindle may be vertically reciprocated to move the gear from the loading and unloading position 38*a* up to the working position 38*b*, Figures 9 and 10, where the hardening operation is performed.

The flame hardening torches T, having appropriate burners 41, Figure 8, are arranged peripherally around the work piece when in working position 38*b*. Each of the torches T are mounted on appropriate brackets 162 adjustably carried in a boss 163 mounted on the annular channel ring 164, Figure 9, for accurate radial adjustment relative to the work. The torches T project through slots 165 formed in an inner annular cylindrical baffle member or chimney 166 mounted inside of the angular ring 164 and suitably connected thereto at 165*a*. The baffle 166 is provided with an interior water jacket chamber 167 which receives a supply of coolant from the coolant pump 168 on the base 44 through the pipes 169, 170, and 171, Figure 8, the coolant discharging from the water jacket chamber 167 out through the drain line 172, which is located at a substantially diametrically opposite position on the baffle ring 166, from which it discharges into the drain line 173 for return to the line 174 back to the reservoir in the base 44.

All of the heat developed by the flame hardening burners rises vertically through the interior of the baffle ring or chimney 166 and all of the various hose lines and associated piping for the torches, as indicated generally at H, are thereby properly guarded from damage by the heat of the flame hardening operation. This specific arrangement is made possible by the vertical positioning of the work holding and torch carrying mechanism for the flame hardening operation so that at all times the operator, with a minimum of difficulty and annoyance to himself, may readily adjust the flame hardening burners 41 for proper heating of the work piece 38 during the flame hardening operation.

The work holding mandrel 159 and bushing 161 are also cooled during the hardening operation from a coolant supply source entering through a pipe 175, Figure 9, connected to the bottom of a cap 176 fixed to the lower end of the sleeve 124. Coolant entering through the pipe 175 is transmitted up through a tube 177 in the center of the work spindle 139 which tubing is secured at 178, Figure 7*a*, to the work spindle 139 by a suitable jam nut 179. Coolant from the tube 177 passes up through the opening 180 in the jam nut 179 and enters a passageway 181 in the mandrel 159 where it proceeds upwardly toward the top of this mandrel and passes outwardly through the diametral passageway 182 formed therein. Coolant then returns through the passageways 183 in the mandrel out through the radial passageways 184 into the passageway 185 into the central large passageway 186 of the work spindle 139. Coolant passes downwardly through the central opening 186 down through an opening 187 provided between a large outside diameter tube 188 fixed to the cap 176 and sliding in the passageway 186 and a smaller tube 189 also fixed to the cap 176 and slidingly engaging over the supply tube 177. The passageway 187 between the tubes 186 and 189 is connected through suitable openings 190 through the cap 176 to allow the coolant to discharge into the base 44.

In order to facilitate the manipulation of the work piece in presenting it on the work spindle 139 and in removing it from the spindle after the completion of the flame hardening operation and delivering it to a quenching tank, there is provided a work handling apparatus as best illustrated in Figures 8, 9, and 10. On the frame 123 is mounted a box-shaped frame 191 by suitable screws 192 on top of which are brackets 193 and 194 held in place by screws 195 on the frame 191. In the brackets 193 and 194 are carried a pair of guide bars 196 upon which slides the work transfer table 197. The table 197 may be reciprocated on the guide bars 196 by means of a compressed air cylinder 198 mounted on the frame 123 by a suitable support 199 which has an outboard bearing 200 to support the outer end of the actuating piston rod 201 of the cylinder 198. On the piston rod 201 is formed a rack 202 which engages a segmental gear 203 journaled on a rock shaft 204 carried in a bracket 205 fixed to the frame 123 by screws 206. Also rigidly fixed on the rock shaft 204 are the actuating arms 207 having elongated slots 208 in which operates roller studs 209 fixed to the transfer table 197 so that application of air pressure in the cylinder 198 will swing the actuating arms 207 to slide the transfer table from the work pickup position 197*a* to the work dumping position 197*b*, Figure 10.

On top of the work transfer table 197 is the tilting work carrier 210 having downwardly extending legs 211 fixed to a rock shaft 212 journaled in suitable bearings 213 mounted on the work transfer table 197. An adjustable stop screw 214 is utilized to set the work carrier 210 level for proper engagement with the work piece 38. Fixed to the rock shaft 212 is a segmental gear 215 which is engaged by a second segmental gear 216 carried on a lever arm 217 pivotally mounted on a suitable stud 218 on the transfer carriage 197. As the carriage 197 is moved to dumping position 197*b*, a roller 219 on the outer end of the lever 217 engages an abutment block 220 fixed to the frame 191 so as to rock this lever counterclockwise, Figure 10, causing the gear 215 and the rock shaft 212 to rotate in a clockwise direction and tip up the work carrier 210 to the dumping position 210*b*, so the work will slide off the surface 210*a* of the work carrier 210 and drop into a suitable quenching tank 221 containing a quenching liquid 222 which is suitably agitated to properly quench the work piece.

At the same time that the work is transferred from the pickup position 197*a* and moved to the dumping position 197*b* by the work transfer carriage 197, a new work piece is automatically presented into position to be picked up by the work spindle. This apparatus comprises a loading platform 223, Figures 10 and 11, which is carried on lever arms 224 and 225 pivotally connected at 226 and 227, respectively, and also with the frame 123 at 228 and 229. A control link 230, pivotally connected at 231 to a bracket 232 formed integral with the work transfer table 197, is resiliently connected through the compression spring 233 and the eye bolt 234 fixed to the arm 225 to cause the platform 223 to move from the loading position 38*x* to the position occupied by the tilting work carrier 210 in pickup position 210*c* as the carrier is moved by the work transfer table 197 to the dumping position 210*b*.

It will be noted that the work loading platform 223 stops in a tilted position convenient for the operator at the front of the machine where he may readily place the work piece on it. Suitable stop brackets 235, Figure 11, hold the work in position on the platform 223. A cut-out portion 236 is formed in the platform for its passage each side of the work spindle 139. A stop screw 236*a* on a bracket 236*b* fixed to the frame 123 positions the platform 223 in the loading position.

The operation of the work handling mechanism is as follows: The operator places a work piece 38 on the platform 223, and applies compressed air from the line 109 to the cylinder 198 by energizing the solenoid 109*b* of control valve 109*c* to move the transfer carriage 197 to dumping position 197*b* while bringing the work piece just placed on the platform 223 into alignment with the work spindle axis indicated at 139*a*. The cylinder 61 is then actuated by fluid pressure to cause the quill 127 and work spindle 139 to rise, moving the bushing 161 into the bore of the gear 38 and to continue this motion to pick up the gear and move it from the loading and unloading position 38*a* to operating position 38*b* where the flame hardening operation is performed. The cylinder 198 is actuated by de-energizing solenoid 109*b* to return the loading platform 223 to initial position shown in Figure 10, bringing the work table 197 and the tilting carrier 223 back to the pickup position shown in Figure 10. A U-shaped cut-away portion 210*c* is formed in member 210 to allow its passage around the work spindle.

As soon as the flame hardening operation has been finished, the work spindle is retracted downwardly by actuating the cylinder 61 whereby the gear strikes the surface 210*a* and is supported on the tilting member 210, the work spindle continuing on downward to fully retracted position, shown in Figure 9. The cylinder 198 is then actuated to cause the work transfer table 197 to move to dumping position 197*b* while again bringing a new work piece that has just been loaded on the platform 223 into position to be again picked up by the work spindle when moved upwardly for the next cycle by the cylinder 61.

*Electrical operating and control mechanism*

Referring particularly to the elementary wiring diagram, Figure 20, the initial power supply for the machine is provided by a three-phase A. C. circuit having the power supply lines L1, L2, and L3. To start the coolant pump 138 in operation, the coolant start button 237 is pressed to interconnect power supply from the lead L1 and lead 238 through the push button 237, lead 239, normally closed stop button 240, lead 241, contactor 242, to the lead 243, connected to line L2 of the power supply. This energizes contactor 242 to close the power contacts 242*a*, energizing the motor 168 from the power supply lines. At the same time, control contact 242*b* is closed to hold in the circuit after the start button 237 is released. Depressing the stop button 240 will break the circuit, de-energize contactor 242, and open contacts 242*a* to stop the coolant motor 168.

The fluid pressure rapid traversing and feeding system is put in operation by pressing the start button 244 so as to complete a circuit from the lead 238, through the start button 244, lead 245, the master stop button 246, lead 247, through the contactor 248, to the lead 243, thus energizing this contactor 248 to cause power contacts 248*a* to close, energizing the driving motor 67 for the fluid pressure pump 66. At the same time, hold in contact 248*a* closes to maintain the aforementioned circuit completed after the start button 244 is released. Also, control contact 248*b* is simultaneously operated to connect lead 238 to lead 249. A green light 250 on the control panel remains lighted by current from lead 245 connected through the light 250 to the lead 243, indicating the hydraulic pump is operating.

In order to put the machine in operation for spot hardening, the flame selector switch 251 is set in hand position so as to interconnect leads 252 and 253. The cycle selector switch 254 is set in pendant position so as to interconnect leads 255 and 256. This puts in operation the pendant of auxiliary push button control station P, Figure 1.

Figure 7:
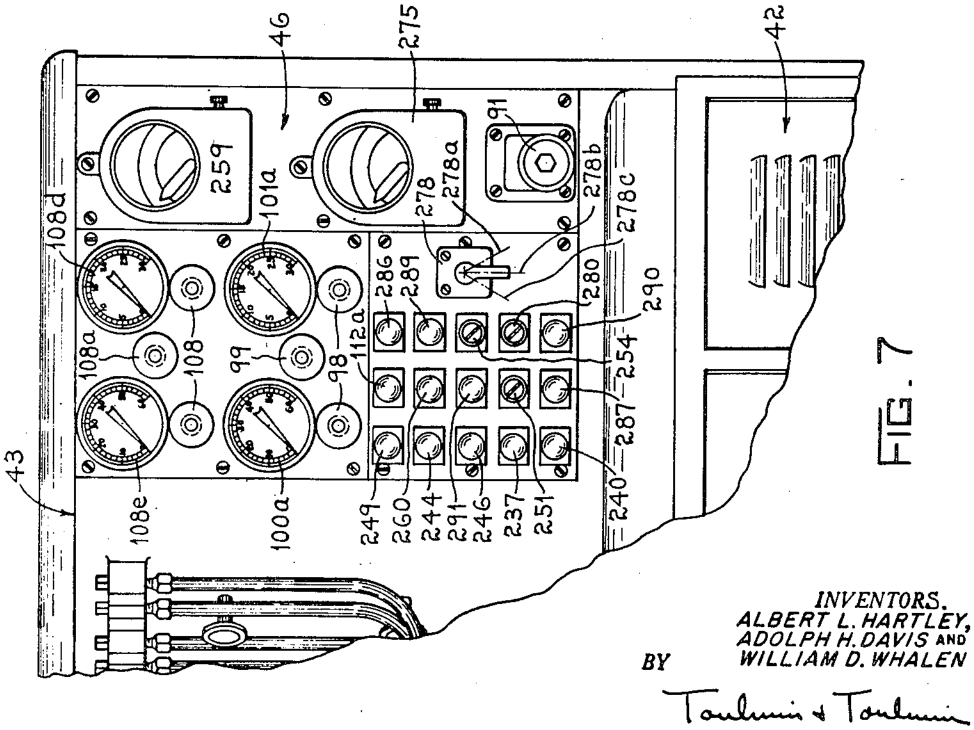

A work selector switch 278, Figure 7, mounted on the control panel 46 has three operative positions: A spinning position 278*a*; a spot hardening position 278*b*; and a progressive hardening position 278*c*. This selector switch controls a series of contacts 278*d*, *e*, *f*, *g*, *h*, *j*, *k*, *m*, *n*, *p*, *q*, and *r* as follows: When selector switch is in progressive position 278*c* contacts 278*e*, *f*, *g*, *j*, *p*, and *q* are closed, the remaining contacts being open; with the selector switch in spot hardening position 278b contacts 278h and 278q are closed, the remaining contacts being open; and when the selector switch is in spinning position 278a contacts 278d, f, g, j, k, m, n, p, and q are closed, the remaining contacts being open.

With the selector switch 278 set in spot hardening position the torch carriage is moved upward in rapid traverse movement by pressing the "up-fast" button 257 on the pendant station which energizes contactor 258 to close contacts 258a and 258b so as to energize solenoid 74 of the control valve 73. When the torch carriage has reached the desired spot hardening position, as indicated in Figure 1a, the needle valves 81 and 87 are closed off so as to hydraulically lock piston 63 in the cylinder 61 to maintain the carriage in the desired spot hardening position. The timer 259 is then adjusted to give the desired heating time of application of the flame to the spot to be hardened on the work piece to bring the part up to proper quenching temperature.

The work piece 26 is then placed on the work fixture 28, the push button 260 pressed, energizing relay 261 which closes contact 261a to energize the flame control solenoid 94, control relay 94a, and the pilot light solenoid valve 79, starting the flow of oxy-acetylene mixture through valves 102 and 103 and causing a flare up of the city gas to ignite the oxy-acetylene mixture. Contact 94b opens simultaneously to de-energize flux decay type timing relay 262, which after an adjustable time interval operates and opens contact 262a to de-energize the city gas supply valve solenoid 94, stopping the flare up of the pilot light and leaving the oxy-acetylene mixture burning. Energizing relay 261 also closes contact 261b which sets timer 259 in operation to close contact 259a to energize relay 263 after a predetermined time has elapsed to thereby open contact 263a to de-energize relay 261 and extinguish the flames, after which the part is then removed from the fixture and quenched.

Should an emergency occur, or should it be desirable to extinguish the flames during the cycle, the push button 264 may be pressed at any time during the cycle to de-energize relay 261, thereby opening contact 261a and extinguishing the flames. To start the spot hardening operation, it is only necessary to press the flames on push button 260 for the next work piece.

Figure 5:
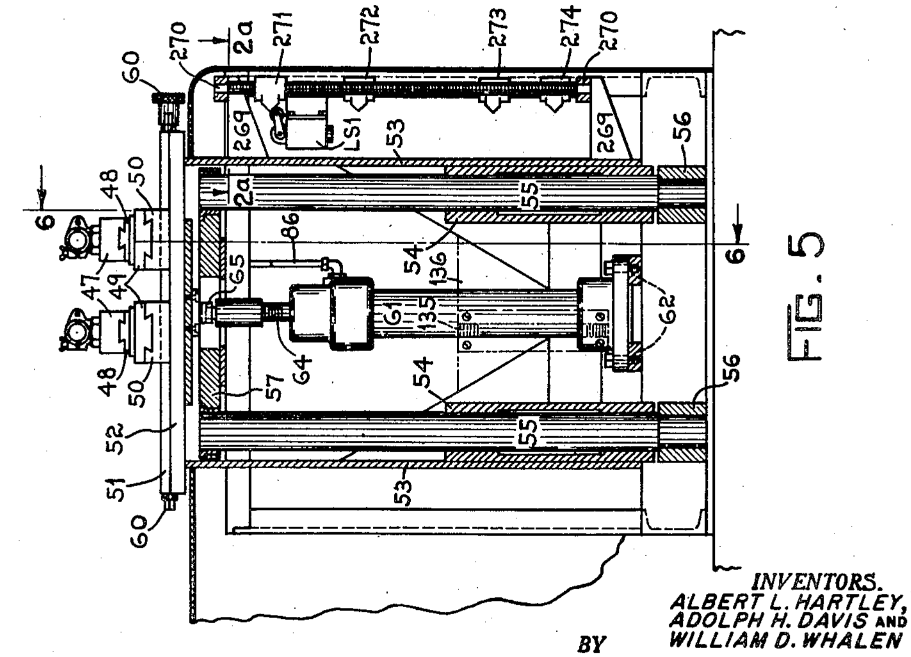
Figure 5 is an enlarged fragmentary transverse section through the machine on the line 5—5 of Figures 1, 2, and 6.

A series of limit switches LS1, LS2, LS3, and LS4, best shown in Figures 2a and 5, are utilized for controlling the change from feed to rapid traverse and direction of movement for the torch carriage and the spinning attachment work spindle reciprocation. On the torch carriage is mounted a series of four threaded rods 265, 266, 267, and 268, the ends of which are secured to brackets 269 by suitable means 270. A trip dog 271, 272, 273, and 274 is provided on each of the rods 265, 266, 267, and 268. Trip dog 271 actuates limit switch LS1, 272 actuates limit switch LS2, trip dog 273 actuates limit switch LS3, and a trip dog 274 actuates limit switch LS4. Each of the respective trip dogs 271, 272, 273, and 274 may be relatively axially adjusted on the threaded rods 265, 266, 267, and 268, respectively, so as to actuate the limit switches at desired points of relative travel of the work and torches.

The functions of these limit switches are as follows: A limit switch LS1 is arranged to be actuated by the trip dog 271 on the rod 265 at the lower end of the stroke of the piston 61 and the downward position of the torch carriage. Actuation of this limit switch LS1 by the dog 271 de-energizes relay 279, opening contacts 279a and 279b, de-energizing solenoid 75 of the valve 73 to stop the downward return traverse movement of the torch carriage and resets all of the electrical relays ready for the next operative cycle.

The limit switch LS2 is actuated by the trip dog 272 which may be adjusted throughout the entire length of its rod 266 for actuation of the limit switch LS2 at any point in the vertical travel of the torch carriage. This limit switch LS2 when actuated stops the upward traverse movement by energizing relay 276, opening contact 276c to de-energize the rapid traverse solenoid 79, which also closes contact 276a to start the initial contact dwell control timer 275 in operation, this taking place due to the closing of limit switch contact LS2b which energizes relay 276 to in turn close contact 276a to operate the timer. Energizing of relay 276 at this time also closes contact 276b to energize the solenoids 112 of the oxy-acetylene valves 102 and 103 to allow gas to flow to the burners when the flame selector switch 251 is moved to the automatic position interconnecting lead 252 with the lead 277. Also, closing of contact 276b under these conditions momentarily energizes the city gas supply line solenoid 94 to cause a surge in the pilot light to ignite the burners.

When the selector switch 278 is set in the spinning position 278a and the flame selector switch 251 positioned in the automatic position of interconnection of lead 252 with lead 277, the limit switch LS2, when actuated, energizes solenoids 112 and 94 in the gas supply lines to allow the burners to ignite on the upward stroke of the carriage in initially approaching a work piece. During the downward stroke of the torch carriage, this limit switch LS2, when actuated, de-energizes the gas line solenoids and extinguishes the burners as the carriage approaches the downward retracted position.

The limit switch LS3 is for the purpose of stopping the upward feed of the carriage after the flames have traversed across the work surface to be progressively hardened. This is accomplished by the opening of contact LS3a to de-energize relay 276, closing contact 276c to thereby energize the traverse solenoid 79. At the same time, relay 258 is energized by closing of limit switch contact LS2a which causes closing of contacts 258a and 258b to energize the up solenoid. De-energizing of relay 276 also opens contact 276b, de-energizing the oxy-acetylene solenoid 112 to shut off the gas flames and simultaneously closes contact 276c to energize traverse solenoid 79 causing further upward rapid traverse movement to end of upward stroke.

Limit switch LS4, when actuated, operates to stop upward traverse movement by de-energizing relay 258 to de-energize the solenoid 74 and the valve 73 and to also put into operation the timer 259 by closing the contact LS4b.

In order to set up the machine for progressive flame hardening, the work selector switch 278 is turned to the progressive position 278c, whereupon contacts 278e, f, g j, p, and q are closed while contacts 278d, h, k, m, u, and r are opened. The type of operation control selector switch 280 is set in non-repeat position of interconnection with lead 281 disconnected from lead 282. The cycle selector switch 254 is set in pendant position of interconnection of lead 255 with lead 256. The flame selector switch 251 is set in hand position of connection of lead 252 from lead 253. The hydraulic pump motor 67 and the coolant pump 168 are started by pressing the respective push buttons 244 and 237.

The burners and torch carriage are traversed up to the vicinity of the work by pressing the up fast push button 257 on the push button station P. The burners are then moved up to exact starting position at a feed rate by holding in the up slow push button 283 which energizes relay 284, opening contact 284a to de-energize the rapid traverse solenoid 79. The trip dog 272 on the rod 266 is then set up to trip the limit switch LS2 at this position. The progressive timer 275 is then adjusted to give the predetermined dwell to the burner for initially heating the beginning edge on the work piece.

The burners are then traversed up to near the top of the work piece to the point where it is desired to have the flames extinguished by holding in the up fast push button 257. The burners are then fed up to exact position where the flames are to be extinguished by holding in the up slow button 283. At this point the trip dog 273 on the rod 267 is set to trip the limit switch LS3, the tripping of which switch extinguishes the flames and operates the solenoid valve in the hydraulic circuit to effect traverse upward of the burners to the limit switch LS4.

To complete the setting up of the machine, the burners are fed up to a position just off the end of the work by holding in the up slow button 283 until the desired top position is reached. Here the limit switch LS4 is set to be actuated by the trip dog 274 on the rod 268, the actuation of limit switch LS4 operating to stop the upward dwell timer 259 in operation. This timer 259 is adjusted to obtain the desired dwell at this point, after which the timer operates to energize solenoid 75 to traverse the burners back to starting position, this being accomplished by energizing relay 263 to close contact 263b which causes energizing of relay 279 to close the contacts 279a and 279b. The downward return traverse may be effected manually by pressing down button 196 on the pendant push button station P.

With the above machine and limit switches set as described, the operator may check their setting by running the burners through the cycle automatically as follows: A flame selector switch 251 is set in a neutral or off position so as to disconnect lead 252 from both leads 253 and 277. The cycle selector switch 254 is set in automatic position of interconnection of the lead 255 with lead 265. The cycle start button 286 on the control panel 46, or a duplicate cycle start button 286a on the pendant push button, station may be pressed. This will cause the burners to traverse up to the lower end of the work piece at which point limit switch LS2 will be tripped which will start the progressive timer 275 in operation. Under these conditions, the limit switch LS2 would normally energize and open the solenoid valves 102 and 103 in the gas lines and allow the burners to ignite but since the flame selector switch 251 is positioned in off position, the solenoid valves will not be operated and the burners will not ignite. After the predetermined dwell, the progressive timer will energize the solenoid 74 in the hydraulic system to start the feed or the progressive movement of the burner upwardly along the work surface. When the flames of the burners are within a very short distance of the upper leading edge of the work, limit switch LS3 is tripped. This energizes the solenoid 79 in the hydraulic circuit to traverse the burners up a short distance until the quench holes are just at the end of the work piece.

Normally, when the flame selector switch is set in automatic position for normal progressive operation, the actuation of the limit switch LS3 at this time will also de-energize the solenoid gas valves 102 and 103 so as to extinguish the gas flames at this point.

When the top of the carriage movement is reached and limit switch LS4 is tripped, the carriage stops its upward traverse movement, and the dwell timer 259 is rendered operative. After a predetermined set dwell at this upward position, the timer energizes a solenoid 75 on the hydraulic circuit and burners rapid traverse back downwardly to starting position, at which point the limit switch LS1 is actuated and the carriage brought to a stop. If the type of operation switch has been set in the repeat position in the cycle with leads 281 and 282 interconnected the cycle would automatically repeat itself.

In case the flames should go out or there should be a flash back in the torches while the burners are passing across the work surface being hardened, the operator may immediately push a red re-ignite push button 287, holding it in for just a second and then releasing it. Releasing this switch energizes relay 288 to close contact 288a so as to energize the gas valve control solenoid 112 and the pilot light control solenoid 94 to re-ignite the gas flames. Contact 288b also closes upon release of the re-ignite push button to energize the relay 258 and reestablish the operating cycle from the point where it was initially stopped.

Should an emergency condition occur where it is desirable to stop the complete operation of the machine while a pass is being made across the work by the burners, the operator may press the emergency stop button 246 which will stop the operating cycle and extinguish the burners.

In order to restart the cycle, the hydraulic pump start button 244 is pressed and then the cycle start button 286 or 286a is pressed. This will reignite the flames and start the progressive timer. If it is not desirable to wait for the full time interval of this timer 275, the emergency feed button 290 may be pressed and held in until the timer has completed its cycle. The emergency feed button then may be released and the cycle will continue.

Should it be desirable to shut off the flames at any time while an automatic cycle is in progress, the operator may press the off button 264. The flames can be re-ignited while an automatic cycle is being made by pressing the on button 260.

In order to set the machine for performing spin hardening operations such as illustrated in Figure 16, the work selector switch 278 is set in the spinning position 278a, Figure 7. The type of operation selector switch 280 is set in the non-repeat position to disconnect lead 281 from lead 282. The cycle selector switch 291 is set in the hand position of interconnection of lead 292 with lead 291a. The flame selector switch 251 is turned to hand position to interconnect lead 252 and 253. The dwell timer 275 is set to the desired time that is required to hold the work piece in initial contact with the flames. The limit switch LS4 is set to the position on the stroke where the work piece will be properly located within the circle of the burners. The hydraulic pump is started by pressing the start button 244 and the coolant likewise started by pressing the push button 237.

The burners are ignited by pressing the on button 260 and may be extinguished at any time by pressing the off push button 264. As a safety feature in connection with the operation of the burners, there is provided a red indicating light 112a which lights up whenever the solenoid 112 for turning on the gas supply burners is energized. The purpose of this arrangement is such that in the event the pilot light would be blown out and the gas would come on, the operator would not recognize this fact, whereas, with the red light, it instantly indicates to him that gas is being supplied to the burners even though they are not burning.

To adjust the machine for spin hardening operations, the hand-off-automatic selector switch 291 is set in hand position to interconnect leads 291a and 293. This energizes relay 295, closing contacts 295a to energize solenoid 108a which causes the cylinder 198 to actuate the loading device to bring the platform 223 to pick up position by the spindle 139 and dump the previously finished work piece into the quenching tank 221. As the piston rod 201 of the cylinder 198 reaches the end of its stroke in bringing a new work piece to pick up position, its end 201a engages a limit switch LS5 mounted on the frame 191, Figure 10, holding its contact closed. Pressing of either of the cycle start buttons 286 or 286a energizes relay 297 and initiates upward movement by energizing relay 258 through limit switches LS4a, LS6, and LS5, upon closing of contact 297a. Pressure is held in the cylinder 198 by keeping solenoid 108a energized by the closing of the holding contact 298.

During upward travel of the work spindle 139 limit switch LS2 is actuated, but the burners ignite only if the flame-on push button 260 has been previously pressed. At the upward limit of travel, either limit switch LS4 or LS6 is actuated. The latter switch is operated by the surface 135a of the rack 135 engaging the arm of the limit switch LS6 which is mounted on bracket 131, Figure 9. Actuation of either of limit switches LS4 or LS6 initiates the timing relay 259 by closing of contact LS4b which measures the length of dwell with the flames on in the upward position. At the expiration of the time setting of the timer 259, relay 263 is energized by closing of contact 259a to in turn energize solenoid 75 to start downward motion. The loading fixture may be returned to its normal position shown in Figure 10, provided the selector switch 291 is moved to automatic position interconnecting lead 291a and 294 by actuation of limit switch LS4 to open contact LS4a, de-energizing relay 295 and solenoid 108a.

In order to set the machine for automatic spin hardening operation, the selector switch 291 is put in automatic position interconnecting lead 291a with lead 294. The pendant-off-on selector switch 254 is set in the automatic position to interconnect lead 255 with lead 285 and the work selector switch 278 is set in the spinning position 278a. The hydraulic pump and coolant pump motors 67 and 168 are started by the operation of their respective start buttons 244 and 237. A work piece 38, Figure 10, is placed on the loading platform 223 of the loading device.

The automatic cycle is initiated by depressing either of the start buttons 286 or 286a to energize relay 297 which in turn energizes relay 295 through limit switch contacts LS4a and LS1b to thus cause the loading platform to move to pick up position over the work spindle 139. Limit switch LS5 is then closed, causing the work spindle to rise and pick up the work and carry it up to flame hardening position inside the burner ring, Figure 8. This upward movement of the work spindle first actuates limit switch LS2 to start the spindle drive motor 147 and also causes the flames to ignite. The spindle continues upward until stopped by engagement of limit switch LS4 or LS6 which breaks the holding circuit through contact 298 for the relay 295, de-energizing solenoid 108a to reverse the cylinder 198 and return the loading device to the position shown in Figure 10, ready to receive the finished work piece and to have the operator place a new piece on the platform 223. At the same time, operation of limit switch LS4 starts timer 259 to measure the length of the hardening operation of the work piece. At the expiration of the time setting of the timer 259, relay 263 is energized to start the downward motion of the spinning spindle. Operation of limit switch LS2 on the downward stroke stops the spindle motor 147. Downward movement is stopped at the bottom of the stroke by actuation of limit switch LS1 which de-energizes relay 297 upon opening of contact 297a to reset the entire sequence for the next operation. The cycle may be continuously repeated by setting the selector switch 280 in repeat position to maintain lead 281 and 282 continuously connected so that all the operator need do is load the work on the platform and trip either of the push buttons 286 or 286a to keep the machine in continuous operation.

Thus, in the spinning operation, the entire operating cycle is performed automatically by simple adjustment of the machine control. The handling of the work for presenting it to and removing it from flame hardening position and quenching it is done in an automatic cyclical manner coordinated with the relative movement of the work and burners.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claim are intended to be included herein.

Having thus fully set forth and described this invention, what is claimed as new and desired to be secured by United States Letters Patent is:

In a universal flame hardening machine, a frame comprising an L-shaped control cabinet section, having a lower horizontal extending portion, a work supporting and coolant base adjacent said lower portion, an angularly disposed face on said upper portion of said L-shaped member, a burner supporting carriage projecting upwardly from said horizontal portion of said cabinet section, means for effecting vertical reciprocating movements in said burner supporting carriage comprising, a vertically disposed pressure cylinder fixed to said frame, a piston rod projecting upwardly from said cylinder, a platen fixed to the upper end of said piston rod, a pair of guide rods fixed in said frame in diametrically opposite positions each side of said cylinder, sliding journals axially reciprocatable on said guide rods, and side members fixed to said sliding journals and said platen to form said burner supporting carriage, gripping devices on said platen for holding burners in position to operate on a workpiece in the machine, a source of fluid pressure for operating said cylinder, and control devices for said source of fluid pressure and the gas and water supply to said frame hardening burners mounted on a common control panel on said angularly disposed face of said control cabinet.

ALBERT L. HARTLEY.
ADOLPH H. DAVIS.
WILLIAM D. WHALEN.

REFERENCES CITED

The following references are of record in the file of this patent:

UNITED STATES PATENTS

| Number | Name | Date |
|---|---|---|
| 2,189,460 | Derhammer | Feb. 6, 1940 |
| 2,202,758 | Denneen et al. | May 28, 1940 |
| 2,264,752 | Groene | Dec. 2, 1941 |
| 2,326,840 | Day | Aug. 17, 1943 |
| 2,368,087 | Bishop et al. | Jan. 30, 1945 |
| 2,407,230 | Furkert | Sept. 10, 1946 |
| 2,429,776 | Shorter | Oct. 28, 1947 |
| 2,448,657 | Bucknam | Sept. 7, 1948 |
| 2,457,654 | Furkert | Dec. 28, 1948 |

FOREIGN PATENTS

| Number | Country | Date |
|---|---|---|
| 520,629 | Great Britain | Apr. 30, 1940 |